(12) United States Patent  
Crowley et al.

(10) Patent No.: US 9,751,550 B2
(45) Date of Patent: Sep. 5, 2017

(54) NO-LIFT INSTALL SYSTEM

(71) Applicants: Aaron Crowley, Canby, OR (US);
Roger Crowley, Tualatin, OR (US)

(72) Inventors: Aaron Crowley, Canby, OR (US);
Roger Crowley, Tualatin, OR (US)

( * ) Notice: Subject to any disclaimer, the term of this patent is extended or adjusted under 35 U.S.C. 154(b) by 0 days.

(21) Appl. No.: 15/212,223

(22) Filed: Jul. 16, 2016

(65) Prior Publication Data

US 2017/0029003 A1 Feb. 2, 2017

Related U.S. Application Data

(60) Provisional application No. 62/198,121, filed on Jul. 28, 2015.

(51) Int. Cl.
| | |
|---|---|
| *B62B 3/04* | (2006.01) |
| *B62B 3/10* | (2006.01) |
| *B62B 3/06* | (2006.01) |

(52) U.S. Cl.
CPC .............. *B62B 3/0612* (2013.01); *B62B 3/04* (2013.01); *B62B 3/108* (2013.01); *B62B 2206/00* (2013.01); *B62B 2206/003* (2013.01); *B62B 2206/06* (2013.01)

(58) Field of Classification Search
CPC  B62B 3/0612; B62B 3/08; B62B 3/04; B62B 3/108; B65G 7/08
See application file for complete search history.

(56) References Cited

U.S. PATENT DOCUMENTS

| | | | | |
|---|---|---|---|---|
| 3,643,935 A | * | 2/1972 | Bell ......................... | B25H 1/00 108/8 |
| 4,339,219 A | * | 7/1982 | Lay ..................... | E04F 21/1822 254/4 C |
| 5,586,619 A | * | 12/1996 | Young ....................... | B66F 3/24 187/226 |
| 5,810,437 A | * | 9/1998 | Sharpe ................. | B62B 3/1444 297/255 |
| 2009/0152224 A1 | * | 6/2009 | Hsieh ...................... | B25H 1/00 211/170 |
| 2014/0021691 A1 | * | 1/2014 | Buttazzoni ............... | B62B 3/00 280/79.11 |
| 2014/0332317 A1 | * | 11/2014 | Campbell ................ | E04G 1/22 182/141 |

OTHER PUBLICATIONS

Abaco Machines USA; Kitchen Processing Table; Dec. 19, 2014; http://www.abacomachines.com/products/detail/id/308.*
Achilli Working Ideas, Catalogue 2008; SC 500; Slab Carrying Trolley; p. 18.*
Tenenco; Cart Conveyor of Plates TB 500II; Nov. 2009; http://tenencorp.webnode.com.br/.*

* cited by examiner

*Primary Examiner* — Daniel J Colilla

(57) ABSTRACT

A rolling cart has a wheeled frame, telescoping vertically extendable members with glide strips, and a tiltable frame having glide strips interspersed with transfer balls to easily slide slabs or sheet materials for construction such as when installing countertops. A method is also described for measuring a minuend desired install height, subtracting a geometrically predetermined subtrahend, and adjusting the height from a floor surface to a pivot axis on the cart to equal the difference, said adjustment being effected by powered lifting means incorporated or ancillary to the cart.

14 Claims, 5 Drawing Sheets

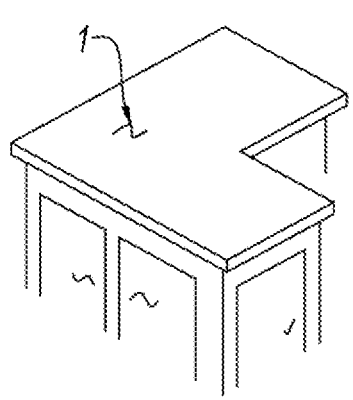
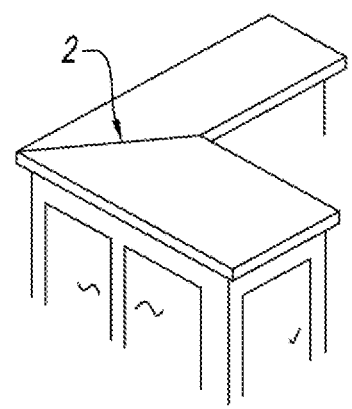
FIG. 1A          FIG. 1B
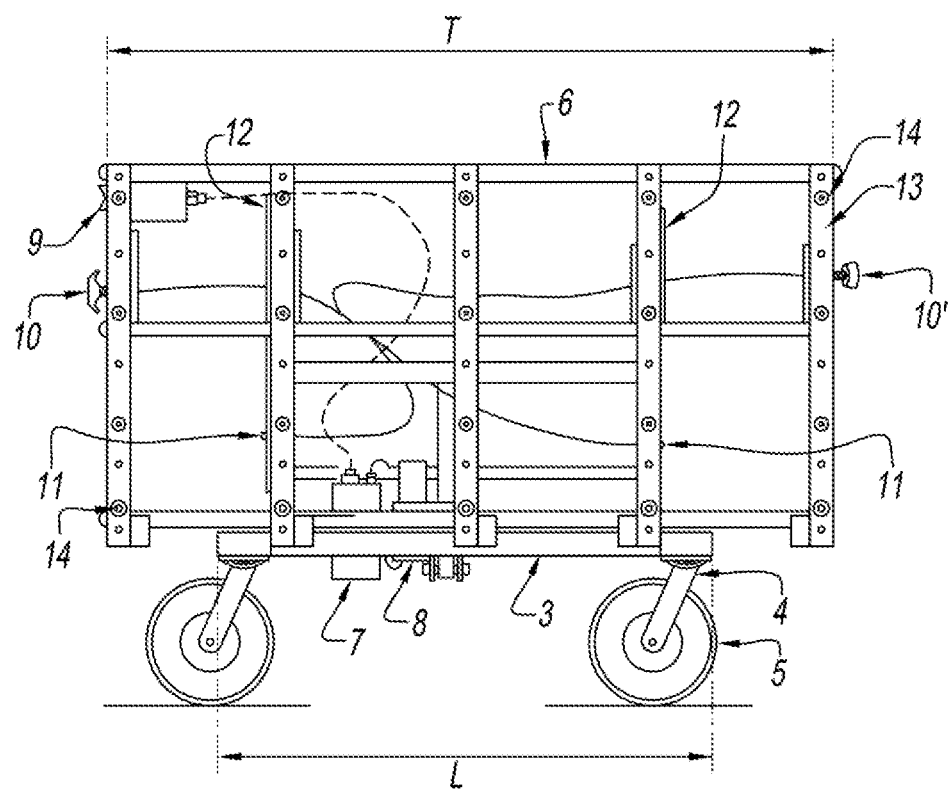
FIG. 2

NO-LIFT INSTALL SYSTEM

PRIORITY: CROSS-REFERENCE TO THE RELATED APPLICATION

This non-provisional utility patent application claims the benefit of and priority to U.S. Provisional Application 62/198,121 "Fabricator's Friend," filed 28 Jul. 2015.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates in general to rolling carts and more particularly to those specifically capable of securing for transport and accurately positioning fragile or awkwardly shaped sheet materials.

BACKGROUND

Wheeled platforms and transport carts for various materials have been known since antiquity. Specifically for the field of this invention, carrying heavy, awkward, and fragile slab countertops by hand from a delivery truck, over terrain and obstacles, up steps into a kitchen, and pivoting the slab from a vertical or near vertical position to a horizontal position at a precise and correct height of the receiving cabinet work has long been a burden and a challenge in the slab countertop industry. It would also be useful if such a device were specially sized to navigate easily from a delivery truck to an install site, especially around corners and in residential spaces which are often more narrowly confined or irregularly shaped than industrial or commercial spaces.

Various devices are currently available which attempt to address these challenges, although many meet only one or two aspects of the totality of the requirements. Thus, carts exist for tilting sheetrock slabs to near vertical for easing transport through doorways, hallways and other narrows passages, and some are adapted to position sections of wallboards for installation, but the task of installing a countertop includes pivoting the sheet material to horizontal. It would be more advantageous that the device pivot the slab while allowing the installer a clear view of the location to receive it, and an opportunity to correct or fine-tune the motion of the slab to effect an exacting and professional-looking installation.

In contrast, some existing devices hold the slab at a disadvantageous angle which blocks this view until the upper edge of the pivoted slab comes to near horizontal. Accordingly, this method only reveals the installation location at or near the end of the pivot motion.

Mention is now made of a device being offered for sale by Easy Slab Transportation Devices LLC of Charlotte, N.C. (hereafter EST Devices or EST.) The EST device has no power assist. In the EST video available on their company website, two horizontal locking pins are seen that look like they snap in to a hole once the tilting frame reaches horizontal. However, they are so far apart that they have to be unlocked by two separate actuations or by two people. If both locking pins are spring-loaded, then two people would certainly be required, because each would be out of reach of a user operating the other. Also, a user of the EST device must reach far underneath the perimeter of a countertop loaded on the tilting frame, or wait until the countertop is free of the cart in order to access the locked-in pins.

A configuration allowing all locking pins to be disengaged by a single act of a single operator would advantageously save labor cost, time, and task complexity. The EST device seems to lack these components and lacks this desired improved utility.

Typical slabs can be made of granite or other material having a granular structure. Although the granular structure can have a pleasing and desirable appearance, thin membranes of such granular materials do not withstand tensile or bending stresses. Breakages during transport are common and costly. It would therefore be advantageous to contrive effective means to secure and constrain a slab or sheet material in a manner which reduces or eliminates bending or warping of the material and reduces shocks experienced in transit when a utility cart carrying a fragile slab is moved over bump-inducing objects in the path of the cart, which can include both outdoor obstacles like pavement layer transitions, garden hoses crossing the path of the cart, steps and sidewalk curbs, and indoor obstacles such as door thresholds, stair treads, transitions from flooring to carpeting, wrinkles in carpet, loose rugs, and children's toys. A desirable benefit of a slab transporting utility cart would be to dampen transit shocks while traversing these obstacles and also to minimize rolling friction by any effective means.

Another need in this industry is to reduce sliding friction encountered when displacing a slab to be installed from the cart to the location to be installed. If the sliding force can be sufficiently reduced, it becomes possible for the installation to be performed by fewer workers or even just one worker. Labor costs savings can translate to lower prices for the end consumer and a competitive economic advantage for businesses who acquire and use such a utility cart over their competitors lacking these benefits and advantages.

BRIEF SUMMARY

This invention relates to rolling carts used for construction jobs installing a unitary slab of material as a counter top in a kitchen. The invention provides means of safely moving fragile slabs from a delivery truck to an install site where mere finger-force actions result in a precise, correct, and aesthetic finished installation of a slab or sheet material which is heavy, often awkwardly shaped, fragile, and shock sensitive in transport.

This invention offers many valuable and useful features which act in concert throughout the transport and orientation phases of a countertop installation and improve worker safety, speed, precise control, and comfort, to allow formerly challenging tasks to be accomplished with ease and an enhanced and professional finished appearance.

The invention has a cable-release system operated by a handle accessible at the periphery of the cart and easy to access. The cable-operated release can also be operated by only one person, and can also be more easily operated while the tilting frame is carrying a countertop. Most important here is that a single actuation unlocks both spaced-apart locked pins simultaneously. The EST device lacks these components and lacks this improved utility and method of use.

A user of the EST device must reach farther underneath the perimeter of a countertop loaded on the tilting frame, or wait until the countertop is free of the cart in order to access the locked-in pins. Conversely, a user of the invention is able to operate and release both locking pins simultaneously from a position where he can observe the motion and position of the slab at all times.

Lastly, one embodiment of the invention offers remote control of the electric motor used to raise and lower the pivot axle height by means of a small hand held key fob. The operator is therefore not required to remain at the cart and can therefore execute other ancillary or advanced tasks related to an expert installation of the sheet material, enabling superior results not possible with any equipment heretofore available.

Accordingly, several objective needs and improvements are met by the invention. A first objective of the invention is secure and stable retention of a fragile sheet material in transit over uneven terrain, obstacles, over steps and stairways, through carpets and rugs, thresholds, and step-changes in a floor.

Another objective of the invention is to effect positive retention and distributed support of a fragile and otherwise unwieldy slab of an arbitrary profile onto a defined, tiltable surface.

Another objective of the invention is to offer detent locking positions at a horizontal orientation and at an in-transit orientation, that being a vertical or nearly vertical orientation. A further embodiment expanding on this objective offers multiple detents with a consolidated release mechanism by which a single operator can release all locked positions with a single actuation. A yet further objective of the invention is to allow release of a tilt-locked frame from any conveniently accessible location on the invention.

Another objective of the invention is to protect the slab or sheet material from experiencing bending or shear forces while in motion.

Another objective of the invention is to reduce the friction between the slab and the cart and thereby reduce the amount at force that a worker must generate when moving a slab such as a countertop from the cart to an install site. Allied with this objective, a yet further objective of the invention is to automatically disengage and retract slab retention members otherwise obstructing the motion path of the slab from the cart to said install site.

Another objective of the invention is the reduction of a two-worker coordinated operation into a movement of the material sheet which can be accomplished by one worker.

Another objective of the invention is the reduction of operator effort used to raise a heavy load by the application of mechanical power rather than by forces generated by the workers' own muscles.

Another objective of the invention is to provide remote control of the height of a pivot axis by means of remote control signals from a hand-held controller.

Another objective of the invention is to provide measurement access to the pivot axis of the machine to permit adjustment of the height of the pivot axis, so that the slab when pivoted to a horizontal position arrives at a predetermined height closely or exactly matching the desired installed height of the slab-receiving support structure on site.

An additional objective of the invention is to pivot the slab to be installed within a range of motion so that the install site to receive the slab remains visible during at least a latter portion of the pivot motion, and also allow fine tuning and final adjustments to this motion and precise alignment of the slab height to its desired final installment height, and that this motion and orientation can be easily and accurately controlled.

BRIEF DESCRIPTION OF THE DRAWINGS

A further understanding of the nature and advantages of particular embodiments may be realized by reference to the remaining portions of the specification and the drawings. Similar reference numerals are used to refer to similar components.

FIG. 1A shows an installed countertop being a unitary "L-"shaped slab.

FIG. 1B shows an installed countertop similar in shape and size to that of FIG. 1A, except it has been split into two trapezoid pieces.

FIG. 2 shows a side view of the invention with the tiltable frame in a near vertical position.

DETAILED DESCRIPTION OF CERTAIN EMBODIMENTS

Figure 3A:
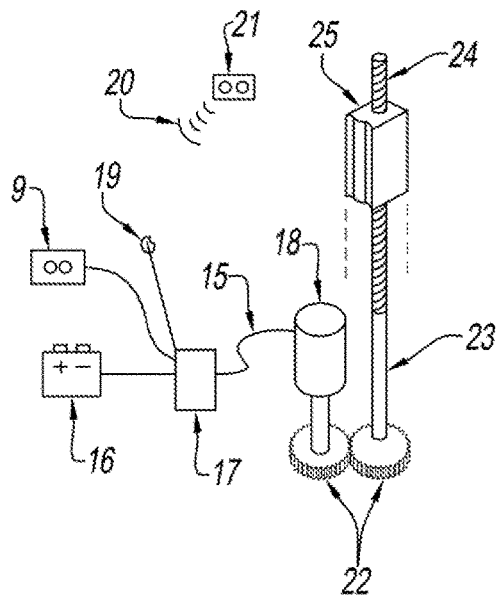
FIG. 3A shows components of the motorized lift actuator assembly.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment the invention, as other embodiments of the invention may omit such features.

Unless otherwise indicated, all numbers herein used to express quantities, dimensions, and so forth, should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In this specification the masculine grammatical gender subsumes the feminine grammatical gender in all cases, so that an operation said to require one man makes it understood that the operation may be equally performed by one woman, and all instances where "he," "his," or "him" are written may be replaced by "she," or "her," as appropriate, to equivalent meaning, effects, intents, and purposes. Also, grammatically irregular plural forms are recognized as their plain language equivalents, so that terms such as "at least one lifter foot" are understood to be equivalent to "a plurality of feet" and other similar phrases of equivalent meaning.

The term "means for . . . " as used herein including the claims, is to be interpreted according to 35 USC 112 paragraph 6.

Also, for bulleted lists of items of an alphabetic series "a," "b," "c" . . . and so on, the letters "i" and "o" shall be omitted from the series to eliminate confusion with numerals "1" and "0."

As used herein, the term "strut" means and describes any substantially linear member, especially but not limited to a beam, rod or bar, moveable or static, which is designed to withstand compression loads and forces and bending moments, and especially to support or lift other objects of mass or weight.

Also as used herein, the term "strut extending mechanism" although in the preferred embodiment is an electric motor driven threaded rod, may refer to any of a plethora of mechanical, pneumatic, electrical, or hydraulic mechanisms used to extend the nested telescoping members of the vertically extendable strut, as would be well known in the industry. Furthermore, the terms "slab," "countertop," and "sheet material" are used interchangeably.

The present invention relates to a novel design for a slab moving device, generally being a rolling cart with a tiltable frame adapted to receive a slab or sheet of material and secure it for transport from a delivery vehicle to an installation site. Most commonly the slab or sheet material is a countertop and the installation site is a buttressed wooden framework designed to support the slab plus the weight of objects used or stored on the counter.

This invention is a rolling cart for applications described in the foregoing summary, and this document details the best known construction of the apparatus and improved installation methods enabled by the same.

The industry to which the invention is directed is primarily the delivery of a large slab or sheet material such as a countertop to be installed in a residence or a commercial site. At the install site or final resting place of the material to be installed, there is usually cabinetwork or a framework prepared to receive the new slab. The prepared works are designed to provide distributed support underneath the installed slab. Thus the invention can also be described more generally as a slab moving device.

A commonly preferred and more challenging installation is shown in FIG. 1A wherein the countertop [1] is a single "L"-shaped slab. A slab of this shape is tricky to transport by hand carry and difficult manipulate into the desired installed position, in part because for typical dimensions, the center of gravity resides outside the actual perimeter of the part; usually located somewhere near the apex of the inside corner of the slab; nevertheless the center of mass of this large slab is occupied by empty space, and so the reaction forces felt at any purchase point used to lift or pivot this slab in space will comprise awkward combinations of dead weight plus some kind of bending or twisting force. Thus, failure to grasp or support a slab at several points, and to move these contact points in concert so as to deliver uniform support to the slab will often allow the slab to break, incurring the hazards and losses mentioned previously, and also including risk of injury to the installer.

A degenerate solution to this difficulty is shown in FIG. 1B wherein the "L"-shape is split into two trapezoids which are lighter, easier to handle individually, and each has a center of gravity inside its perimeter profile. However, an installation using this method must include at the meeting joint [2] of the two trapezoid pieces a line of caulking, grout, or other sealant which is much less visually appealing than the uniform unbroken surface of the slab of FIG. 1A, and if subject to deterioration over time, cleaning fluids or biological fluids from food preparation may be absorbed into the grout or leak into the cabinet space below. An installation of the unitary slab of FIG. 1A is therefore much preferred, and this invention succeeds to abet this more challenging task.

As seen in FIG. 2, the inventive rolling cart comprises a lower frame [3] typically constructed of welded rectangular tubing, a plurality of swivelable mountings such as casters or swivel trucks [4] holding wheels [5,] and a plurality of vertically extendable struts better seen and discussed in later figures. The rolling cart has a length L illustrated in this figure, and cart stability and ease of navigation is enhanced when the cart length dimension L is between 34 inches and 46 inches inclusive. Also illustrated in this figure is a length dimension T of the tiltable frame, and operable embodiments exist with T in a range of 60 inches plus or minus 12 inches. A ratio of T divided by L is preferred to be within a range of 1 and 2 inclusive, and a best mode is observed with T/L equal to 1.5.

A tiltable frame [6] is tiltably mounted, that is, rotatably coupled to the upper ends of the vertical struts and in this figure it is shown at a vertical position or a nearly vertical orientation also called an in-transit orientation. Since the invention is directed to transporting sheet materials or slabs, the tiltable frame is a generally planar frame. A vertically extendable strut has a telescoping mechanism which can raise and lower its upper end with respect to the lower frame of the rolling cart and the floor.

Extension, retraction, and controlled positioning of struts can be effected by any mechanisms, including but not limited to linear actuators which can be operated by electronic, hydraulic, pneumatic, or other means, and also mechanical extension means such as but not limited to a rotatable threaded rod or bar, defining by its shape a longitudinal axis, and operating substantially parallel to a strut or inside a hollow strut, wherein a first portion of the rod is constrained from axial travel and affixed to a portion of an extendable strut, and a second portion is threadably coupled to another portion of said extendable strut, so that rotation of the treaded rod effects linear translation of said second portion with respect to said first portion, effectively changing the length of said strut. When a strut length increases, this motion is defined as extension of an extendable strut and conversely, retraction of a strut is defined as a decrease in the length of a strut. Also within this specification, an extendable strut may be referred to as an extendable member, and an extendable member may not necessarily be oriented vertically within the invention.

With the tiltable frame [6] in the in-transit position shown, this figure also shows a battery box [7] containing therein a rechargeable battery, electrically connected to a motorized lift actuator assembly [8] also described further below. A control box [9] has buttons, switches, or a rocker switch which applies current to drive the motor within the lift actuator assembly so as to raise or lower the vertical struts and thereby also raise and lower the pivot axis defined by pivot axles in these struts. Each vertically extendable strut locally defines the pivot axis by means of rotatably coupling the tiltably mounted frame to said strut. Pivot axles may be employed to effect this rotatable coupling, and these axles may be part of the strut or part of the tiltable frame.

Also seen in this figure are the cable-release handle [10] to which all cable-release operated locking studs [11] are coupled. This configuration enables the tilted frame to be locked in a vertical position, a nearly vertical position, a horizontal position or horizontal orientation, and any other orientation deemed convenient. This configuration can be generally referred to as a tilt lock, because the tiltable frame can be locked or fixed at any desired orientation. The locking studs are seen here passing through apertures in pivot plates [12] which are edge-on in this view, but are better shown in other views. However, it is seen in this view that all locking studs of the invention can be retracted from all pivot plates simultaneously a single, one-handed actuation of the cable release handle [10.] More than one handle may be included in the invention and located at more than one location and at any convenient location. An additional release handle [10'] is also shown in the figure. A best mode incorporates at least two handles located on opposite sides of the tiltable frame, and actuation of any one handle affects the entire set of the tilt locks in concert. Although handle [10] is depicted as a T-handle and handle [10'] is a ball handle, any handle can be of any shape, preferably offering good ergonomics, positive location by touch rather than sight, and good grip. A subset of tilt locks or the entirety of the tilt locks can be released by using any one of these handles or by a one-handed operation, and the cable release system can also include additional mechanisms such as servos or solenoids. Furthermore, these and similar release mechanisms can be operated by remote control, such as by receiving signals from a key fob or being controlled by an app or software residing and active in a cell phone, a smart phone or a tablet or other computer. Actuating signals can be sent by any physical or electronic means, including the 'tap' or mechanical motion or impact sensing functions built into a computer, smart phone, or hand-held electronic device.

A cable release in this specification is a system of one or more lengths of cable, usually shrouded over at least a portion of length by a tube or a channel, connecting at least one release handle to any of at least one locking member of a tilt lock system.

Lastly in this figure, the tiltable frame [6] is also seen comprising a welded assembly of rectangular tubes wherein frame members are overlain with friction-reducing glide strips [13] held to the frame by permanent adhesive or fasteners or both, and these strips and the underlying frame members are perforated with apertures into which are disposed transfer balls [14.] The combination of spacing of the frame members with the spacing of apertures within each member presents a uniform array of transfer balls which will support a countertop slab at many points simultaneously, limiting the risk of breakage in transit or during the sliding motion off the cart and into its final installed position.

A "transfer ball" in this specification is also commonly referred to as a "ball transfer" and is a receptacle supporting a ball bearing so that the ball is spinnable in any axis in its receptacle. These are used extensively in conveying and material handling apparatus where loads need to be moved smoothly, precisely and with minimum effort in any direction. An array of transfer balls also allows rotation of a load within a fixed plane. Supported on a planar array of transfer balls, translating a slab while rotating the slab is thus made possible, because the multi-axial rotation of the transfer balls in the array permits these more complex motions of the slab. In this invention, the transfer balls are seated into apertures in the tiltable frame so that the zenith of each ball touches tangent to, or slightly pierces the plane defined by the set of exposed surfaces of the glide strips. This arrangement allows the easy-spinning balls to greatly assist with reducing the sliding friction of the countertop when in motion on the tiltable frame. When especially slick plastic material such as ultra-high molecular weight polyethylene (UHMW-PE) is used, the friction is so reduced that a two-man job transferring a countertop into its installed position can now be accomplished by one man.

The inclusion of transfer balls on a tiltable frame of a rolling cart directed to transport of a slab, and assisting the horizontal motion of said slab for installation as a countertop was seen nowhere in any related art or any other device presently in service within the field of the invention and is thus a notable point of novelty.

Moving on, we examine in FIG. 3A some components of the motorized lift actuator assembly comprising an operable strut extending mechanism. The control box [9] is illustrated here as having two discrete buttons for electrical signals for raise and lower commands, but any sort of switch can be employed, such as rocker switch having a center-off rest position and issuing the electrical raise and lower commands at its two depressed states is also within the scope of the invention. Power and signaling is distributed by multiple conductor electrical cables or a wiring harness [15] interconnecting the components. Power is supplied by rechargeable battery [16] and a controller module [17] delvers power to a reversible motor [18] or control pulses in an embodiment where the motor [18] is a stepper motor. Generally, the strut extending mechanism is driven by a battery powered motor controlled by a switch.

In one set of embodiments, the strut extending mechanism and battery powered motor are operated by remote control. The control module can have a signal receiving antenna [19] receiving electromagnetic signals [20] emitted by a convenient hand-held key fob [21] or similar compact controller. The lift motor assembly uses reduction gearing [22] to drive a threaded shaft [23] for vertically transmitting a lifting thrust force. External threading [24] on the lifting shaft transmits vertical force into the upper end [25] of a vertically extendable strut.

Figure 3B:
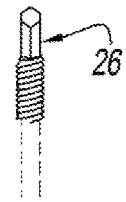
FIG. 3B shows a hex-drive embodiment of a lifting shaft.
Figure 3C:
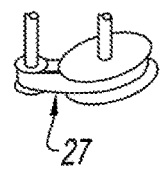
FIG. 3C shows a belt drive coupling of the motor shaft to the lifting shaft.

FIG. 3B shows another embodiment of the threaded shaft which terminates with a hexagonal cross section [26] at its tip. This embodiment allows the tiltable frame to be raised and lowered by a socket wrench fitted to the hexagonal section of the lifting shaft, or power-driven by a cordless or electric drill grasping the hexagonal section with its chuck.

Also, although reduction gearing is described to transmit rotary power from the lift motor to the lifting shaft, FIG. 35 shows another embodiment using a drive belt [27] and pulleys. Silent chain and sprockets are also contemplated within the invention.

Figure 4:
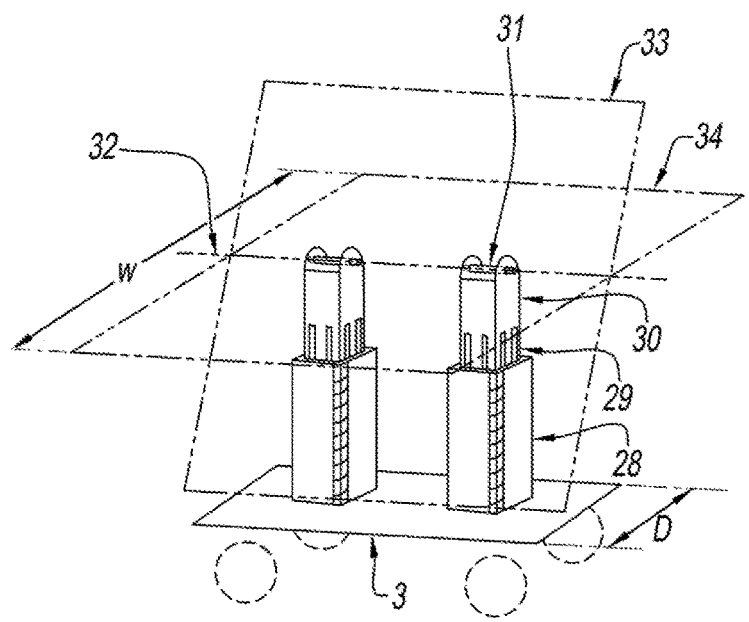
FIG. 4 shows two vertically extendable struts defining a pivot axis of the invention.

FIG. 4 examines the telescoping, extendable vertical struts [28] arising from the rolling cart [3] of which the preferred embodiment has at least two. The struts are each comprised of a nested series of at least two rectangular tubes. The nested contours of the tubes enforce uniaxial translation of all members comprising the strut. In this illustration, a fixed base tube surrounds one linearly movable inner rectangular tube [30.] The inner tube has strips [29] of adhesive-backed slick material such as UHMV-PE of a thickness selected so that the thickness of the adhesive plus that of the strip material is approximately one half of the clearance between tube walls in a given direction. Thus, sets of strips [29] affixed to opposite sides of a rectangular tube completely take up the clearance, and provide smooth, uniaxial extension with no slop or rattle. Applied to all four sides of an inner rectangular tube [30,] a novel means of precision extension along one axis is afforded and is ideal for effecting precise positioning of the slab or material sheet carried by the tiltable frame.

Each strut has a vertically movable upper end holding a pivot axle [31] and all pivot axles are coaxially aligned, thereby defining a single pivot axis [32] for the tiltable frame, which is threadably coupled to the movable upper end of each vertical strut by the pivot axles of each strut. The rolling cart therefore has a vertically adjustable pivot axis for the tiltable frame as defined by the vertically extendible struts. The tiltable frame is vertically adjustable as is the height from the cart to its pivot axis.

Next, FIG. 4 illustrates by phantom lines the tiltable frame in its vertical or near vertical in-transit orientation [33] and its horizontal position [34.] FIG. 4 also illustrates a width dimension D of the rolling cart, which is discussed elsewhere in this specification. Furthermore, although the pivot axis [32] is shown nearly centered within the width w of the tiltable frame, the invention does not require this constraint; indeed where certain preferred dimensions or standards exist for slab materials, a tiltable frame may have a pivot axis elsewhere than the centerline of its width. For example, working with a common standard 26 inch slab width for U.S. residential kitchen counters, a desirable and useful embodiment within the scope of the invention is one wherein the descending side of the tiltable frame is shorter than the ascending side, so that the center of gravity of the slab material is elevated while in transit and descends while the frame tilts to the horizontal install orientation. When the drop in center of gravity is slight, the tilting motion is easy and controllable by the installer. Workers enjoy the feel of a slight gravity assist and are less likely to overexert or injure themselves using the invention.

Figure 5:
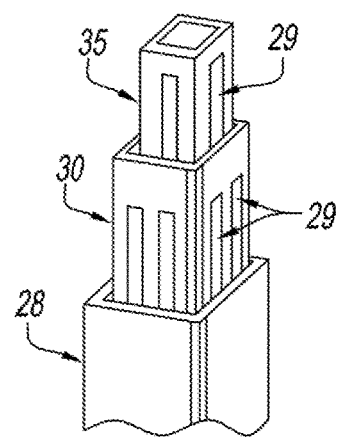
FIG. 5 shows nested, telescoping rectangular tubing with glide strips.

Nested arrangements of multiple rectangular tubes are also contemplated within the invention, as illustrated in FIG. 5. The vertical strut [28] with its inner rectangular tube [30] may itself contain a smaller rectangular tube [35] within its inner walls, although three nested tubes are shown in this figure there is no limit to the number of telescoping tubes which may be so concentrically and coaxially nested. Each inner tube may have on its external walls one, two, or any number of friction reducing strips [29,] of properly selected thicknesses such that the entire extensible assembly operates smoothly and with no axial misalignment of the rectangular tubes comprising the telescoping assembly.

Figure 6:
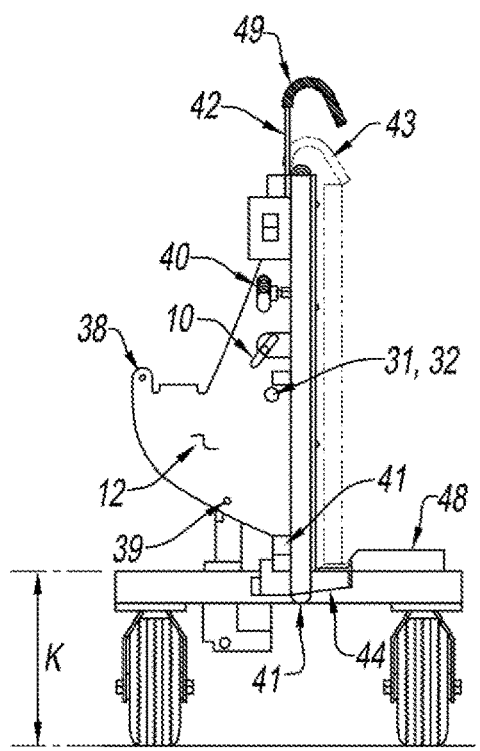
FIG. 6 shows an end view of the inventive cart.

FIG. 6 shows an end view of the inventive cart, with the tiltable frame raised and locked in the in-transit position by means of a tilt lock. The tiltable frame is rotatably coupled to the rolling cart, and tilt locking is effected when least one aperture [39] of a pivot plate [12] receives a cable-release operated locking stud [11 of FIG. 2] affixed to the rolling cart. When the tilt lock is engaged, rotation of the tiltable frame with respect to the cart is prevented and the angle of the tiltable frame with respect to the cart remains fixed until the tilt lock is released. For the tilt lock of the embodiment shown here, the tiltable frame has at least one pivot plate [12] extending downward from its underside. Locking members operate between the cart and the tiltable frame, and these can be releasably engaged so that in an engaged state, cable-release operated locking studs [11 of FIG. 2] for each pivot plate are locked in an aperture [39] present in each pivot plate and defining the in-transit orientation of the tiltable frame with respect to the rest of the invention. A second aperture [38] locks the tiltable frame in a horizontal orientation. In both locked conditions, the frame remains unable to rotate unless the cable-release handle [10] retracts the locking studs from the apertures [38] or [39.]

FIG. 6 also illustrates a cart height dimension K further discussed elsewhere and important to the stability of the cart and the smoothness and safety of the tilting motion. Operable embodiments of the invention exist with K being 15 inches plus or minus 4 inches.

In constructing the cart frame or fabricating the tiltable frame from tubing, leaving tube ends open presents a number of hazards. Sharp, open ends of square cut rectangular tubing present unnecessary hazards on the job such as lacerations, gouging and scraping risks to walls, furniture, appliances, painted surfaces, and more. Bumpers [41] preferably of soft material such as rubber, are provided to cap off all open tube ends of both the tiltable frame weldment and the lower frame weldment of the rolling cart, and at other selected points along the perimeter of the frame to mitigate the risk of damage or injury.

Also shown in FIG. 6 is at least one restraining hook [42] of the invention. Each restraining hook resides in a hook housing mounted to the tiltable frame. A restraining hook is extendable from within its housing, having a shaft portion extendably and rotatably coupled to the tiltable frame. A lockable extendable restraining hook can be extended as desired and rotated and locked in position. In use, the hook portion is positioned over the top edge of a countertop (here illustrated by phantom line.) The hook portion is covered or coated in a rubber or other elastomeric material [49] which can compress so as to securely grasp the upper edge of the countertop. Then, its shaft portion is fixed in place by twisting a lock knob [40.] The lock knob holds the restraining hook in a locked state [43] imping on the extendable shaft hook to fix it in place using the same basic principle as a set screw. The upper edge of the countertop is now effectively secured for transport by means of the lockable, extendable, rotatable restraining hook. The bottom edge of the countertop is similarly restrained by a set of lifter feet [44] deposed along the bottom edge of the tiltable frame.

Lastly for this figure, the lower frame of the rolling cart also has at least one transit chock [48] spaced away from the vertical struts [28 of FIG. 4] leaving a gap. With the countertop secured to the tiltable frame, and this frame tilted to the in-transit position, the height of the tiltable frame can be lowered so that the lower edge of the tiltable frame and the countertop it is carrying will drop into the space between the vertical struts and the one or more transit chocks. This condition enhances in-transit safety because in the event that the pivot plates become accidentally unlocked, uncontrolled rotation of the tiltable frame will be confined to a narrow angle between the vertical strut and the transit chock. This is a redundant safety feature found in no other wheeled cart directed to the transport of sheet materials and countertops. The pivot axle [31] and pivot axis [32] appear endwise in this figure.

Figure 7:
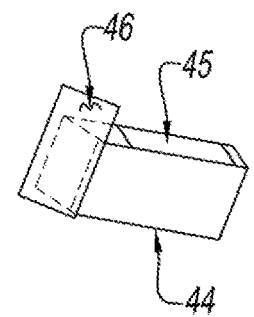
FIG. 7 shows a lifter foot with its friction pad and safety rim.

FIG. 7 shows a lifter foot [44] with its friction pad [45] and safety rim [46.] The safety rim is mounted at an end of the lifter foot and acts as an end cap. The lifter foot has an inherent cross section, and the safety rim extends beyond the cross section of the lifter foot so as to catch or capture the slab supported by the lifter foot. The safety rim thereby aids in securing the slab for safe transport. The friction pad is non-slip material such as EPDM rubber, or any softer material effective at establishing a high-friction contact when supporting the weight of the slab. In the in-transit position, the safety rim extends above the lower limit of the edge of the countertop, so that in cooperation with the one or more extendable hooked shafts constraining the upper edge of the countertop, the countertop is well secured to the tiltable frame during transport and during the pivot motion of the tiltable frame into its horizontal locked position.

Figure 8:
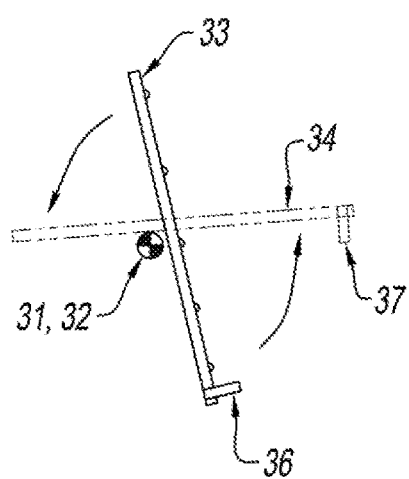
FIG. 8 shows and end view of the tiltable frame rotating from an in-transit position to a horizontal position and the corresponding drop-away action of the lifter feet.

FIG. 8 shows an end view of the tiltable frame rotating from an in-transit position [33] to a horizontal position [34] and the corresponding drop-away action of the lifter feet. Each lifter foot is loosely and slidably coupled to the tiltable frame. They are manually extended when the frame is in its in-transit position and a slab gets loaded onto the frame. In their extended position [36,] the lifter feet catch the lower edge of the countertop and support it on a high friction surface. Once the countertop is rotated to the horizontal position, backing the countertop edge away from the lifter feet enough for their safety rims to clear the edge of the countertop will allow the lifter feet to freely drop into a retracted position clear of the next intended motion of the countertop into its installed position. Gravity pulls the lifter feet down to a retracted position [37] which is an elevation beneath the underside surface of the slab, so they are out of the way of lateral motion sliding the slab off the tiltable frame and into its final installed position. Thus the lifter feet are automatically retracting lifter feet retractably mounted at an edge of the tiltable frame. For reference, the pivot axle [31] and pivot axis [32] are shown and are endwise in this figure.

The lifter feet are illustrated with only one friction pad positioned on a face suitable to address the weight of the countertop being transported. However, additional high-friction material may be deposed on the face directly opposite the countertop bearing surface so that the weight of the countertop impinges through the lifter foot to the coupling surface or complementary surface of the aperture in the tiltable frame which receives the lifter foot. This additional high-friction material would serve to lock the lifter foot in place during transport and enhance the immobilization of the countertop relative to the tilt able frame. This embodiment is also within the scope of the invention.

Figure 9:
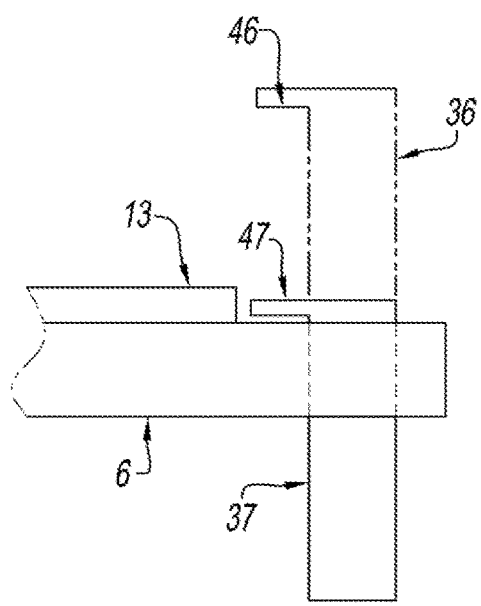
FIG. 9 shows an enlarged view of a lifter foot in an extended position on the tiltable frame, and a drop-away position.

Next, FIG. 9 shows an enlarged view of a retractably mounted lifter foot in an extended position [36] on the tiltable frame [6] and a drop-away or retracted position [37.] The safety rim feature [46] of the lifter foot is also clearly seen here. The drop-away action of the lifter foot occurs with the tiltable frame in its horizontal orientation and when the countertop backed out from under the overhanging portion of the safety rim. The lifter foot is now clear to fall to a retracted position [37.] Since the highest remaining surface of the lifter foot [47] comes to rest at or preferably below the surface of the glide strips [13,] the lifter foot does not interfere with the horizontal motion of the countertop moving off the tiltable frame [6] and into its final installed position at the site.

Figure 10:
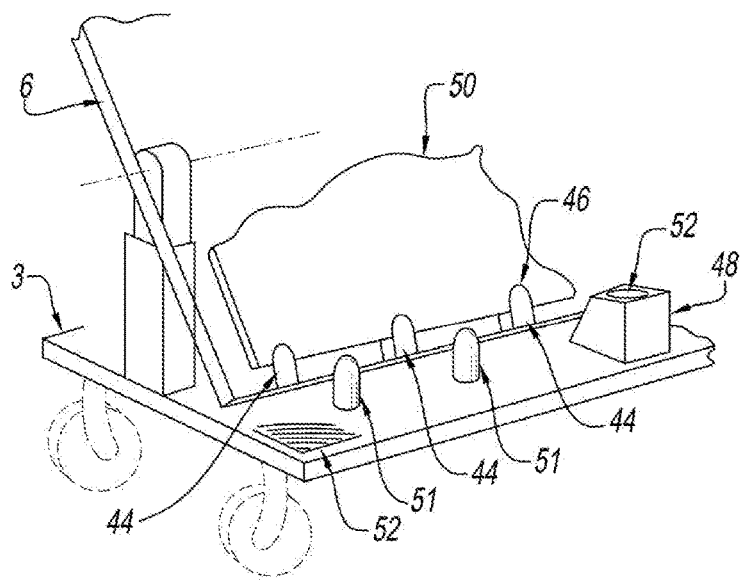
FIG. 10 shows an additional embodiment of the cart with the tiltable frame in an in-transit position, and having additional features to secure the slab while in motion.

FIG. 10 shows the invention with its tiltable frame [6] in an in-transit position, with additional features which secure slab, countertop, or other sheet material [50] while in motion. This view shows the rolling cart [3] and one of the at least one transit chock [48.] Here, the lifter feet [44] of the tiltable frame [6] are seen to have been extended, and while supporting the lower edge of the sheet material [50] the safety rims [46] can be seen here effectively trapping and securing the sheet material along its lower edge. Support blocks [51] of compliant material such as rubber or rubber-like elastomeric material are affixed to the rolling cart, in predetermined positions so that when the tiltable frame in an in-transit orientation is lowered, other portions of the lower edge of the sheet material between or besides those areas touched by the lifter feet [44] now come to rest in contact with the tops of the support blocks [51] which act as compliant suspension members while taking up part of the weight of the sheet.

Now the slab is compliantly secured from above by the elastomeric material in the hooked portion of the restraining hook. With these shafts locked in position, the slab is secured from below by the compliant material of the support blocks [51,] while further being secured to the plane of the tiltable frame by the grabbing action of the safety rims [46] of the lifter feet [44,] the sheet material is better protected and secured for transport than any other device known to the inventors.

One further feature of note in FIG. 10 is that areas of adhesive backed high-friction material [52] similar to the high-friction material [46] affixed to the lifter feet [44 of FIG. 7] may also be affixed to surfaces of the rolling cart [3] and also to surfaces of the transit chocks [48.] This material may derive its high friction as an inherent material property, or by surface features such as ribbing, relieved features, textured surfaces such as orange peel puckering or Mold-Tech 11060, or other engineered surface roughness texturing.

As an alternative to support blocks, areas of compressive, adhesive-backed high-friction materials may be affixed to the lower frame of the rolling cart, and the slab material may be similarly secured for transit by lowering upon at least one area of compressive, compliant material.

Figure 11:
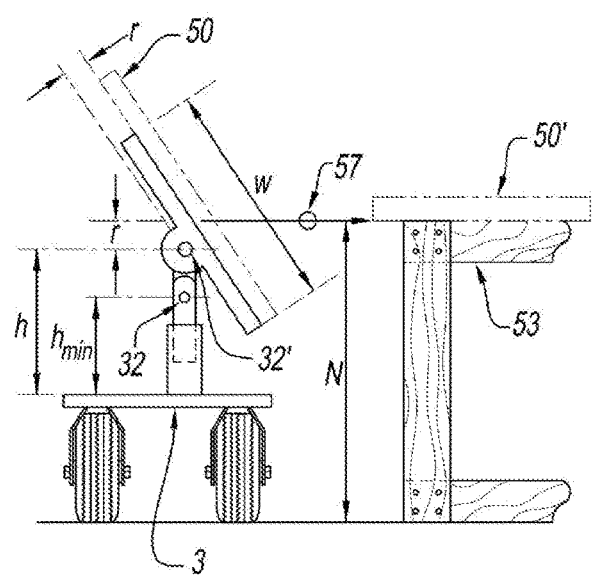
FIG. 11 shows the relationship between certain dimensions of the tiltable frame and the vertically extendable struts, and shows a typical install height.

Moving on to FIG. 11, the invention is described in further detail. Restraining hooks and lifter feet are omitted from this figure and from FIG. 12 for clarity. The pivot axis [32] in previous figures can be vertically positioned anywhere between a minimum height $h_{min}$ above the lower frame [3] of the rolling cart, to a raised height h whereby with the tiltable frame in its horizontal orientation, the height above the floor N of the underside surface of the slab [50] to be installed matches the height of the cabinetwork [53] or a framework at the install site which has been prepared to receive the new slab.

Designating the width of the tiltable frame as w, the inventors have discovered that operable devices exist where the ratio $w/h_{min}$ resides within a range from 1 to 4, with an optimum value of w being twice (2×) $h_{min}$. Also, to offer a stable and safe platform for the tiltable frame, the cart has its own width dimension D shown in FIG. 4, and a length L shown in FIG. 2. The inventors have further discovered that the ratio of w versus D contributes to the stability of the cart and to operator safety, ease, and control during tilting of the slab. For best utility in maneuvering inside residences and other possibly unusually confined spaces, a ratio of width D to w is effective between 0.3 and 1.2, with a best mode residing a little above ⅔. For practical purposes, the inventors have also found that the cart is more easily navigable in residences when the one width dimension D is between 18 and 30 inches inclusive, while the other width dimension w is between 24 and 36 inches inclusive. Also for stable maneuvering, a ratio of L divided by D is preferred within 1 and 2 inclusive, with a best mode residing around 4/3. In addition, operative embodiments exist when a ratio of tiltable frame length T and said frame width w resides within 1.5 and 2.5 inclusive, with a best mode observed at or near 2. These dimensional extents and ratios enhance stability in rolling motions and operator ease, safety, control over slab motions during tilting, and precise positioning of a slab.

In addition to the install method generally described previously, the invention allows the user to adjust the height (above the floor) of the pivot axis before the slab is pivoted from its in-transit orientation to horizontal. Most advantageously, the invention allows a process whereby the horizontal position can be adjusted in advance of the pivot step so that when the tilt lock locks the tiltable frame in a horizontal orientation, the height of the underside surface of slab will be equal to that of the desired installed height N of the slab-receiving support structure on site.

The process involves a user who can know or measure in advance a distance r in FIG. 11 from the surface of the tiltable frame upon which the slab [50] rests to the pivot axis [32] of tiltable frame. This user when at the install site can now measure the height N from the floor to the desired final installed height and retain that figure as a minuend, then recall as a subtrahend the foreknown distance r from the surface of the tiltable frame upon which the slab rests to the pivot axis of tiltable frame. The user then subtracts the subtrahend from the minuend to arrive at a difference value. When the user adjusts the height of the pivot axis [32'] above the floor to that difference value, the user can then pivot the slab to the horizontal orientation in confidence that the slab will arrive at a height ready to immediately slide off the tiltable frame directly into the installed position [50'.] Advantageously, this process reduces time and effort while vastly simplifying and improving the ease, safety, and speed of a countertop slab installation. A further embodiment of the invention includes means for affixing and aligning a light source such as a laser pointer to a vertically extendable portion of an extendable strut so that the light beam [57] can be used to confirm that the height of the tiltable frame in its horizontal position will equal the desired install height N.

Figure 12:
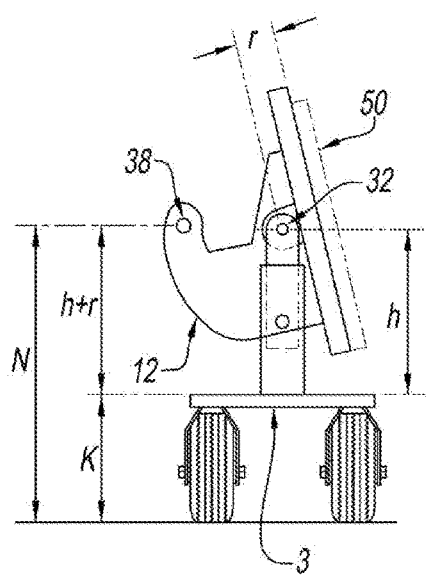
FIG. 12 shows an additional embodiment with an aperture in a pivot plate at a predetermined height above the floor.

FIG. 12 shows yet another embodiment to aid with proper adjustment of the pivot axis to pivot the slab [50] to its desired install height N. Here, the pivot plate [12] is designed with an aperture [38] in a predetermined location so that when the tiltable frame is detent locked for transit, with a height it of the pivot axis [32] above the lower frame [3] of the cart, then the height of the aperture [38] above the lower frame [3] is equal to the subtrahend value r defined previously. The frame may incorporate multiple pivot plates moving in concert with the tilt motion of the frame and allowing tilt locking to occur in more than one location of the invention. Advantageously, an aperture in this position may be used like a peep-sight on a rifle, allowing the operator to sight through one or more apertures to the height of the slab-receiving structure and adjust the pivot axis height so as to zero in the tiltable frame height to the desired install height N. This method is enabled when a sum h+r of the height h from the cart to the pivot axle, plus the subtrahend value r, plus the height of the cart K all equal the install height N.

Figure 13:
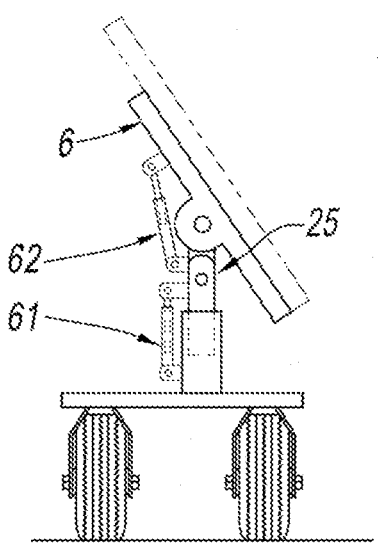
FIG. 13 shows an additional embodiment including mechanical dampers operating between an upper end of a vertically extendable strut and a rigid portion of the rolling cart, and also operating between the upper end of a vertically extendable strut and the tiltable frame.

FIG. 13 shows additional embodiments of the invention which include at least one gas shock absorber [61] connected between the vertically movable upper end [25] of a strut and a vertically stationary portion of the rolling cart. The gas shock absorber is one kind of extendable member which offers snubbing, or mechanical damping during extension or retraction. Such mechanical dampers, also called damping members, allow smooth and safe motion of the mechanically coupled parts and allow an additional embodiment of the invention which includes a gas shock absorber or similar damping member [62] as a linearly extendable member connected between the vertically movable upper end [25] of a strut and the tiltable frame [6.] This embodiment smoothens the tilting motion of the slab material and further protects it from shock, thereby reducing the likelihood of material breakage. By also reducing risk of accidental, rapid, or unpredicted tilt motions, snubbing of the tilt motion of a tiltable frame also reduces the risk of operator injury. As further contemplated within the invention, rotational snubbing may be effected by at least one rotational snubber incorporated within the rotational couplings of the tiltable frame to the pivot axles of the strut or struts.

Although the invention as detailed focuses on the installation of countertops in residential kitchens, any similar installations of large, two-dimensional sheets of materials can be assisted by the invention, including materials designed for any sort of table-like workplace or work cell, such as installing sheets of special conductive or static eliminating materials as a workbench for electronics assembly, or sheets of specialty material for use in larger food processing concerns such as industrial kitchens or abattoirs, or even medical or veterinary premises or laboratories where a sheet of especially hypoallergenic, efficacious (easy to sterilize) or bacteriostatic material is desired, and where the sheet has large two-dimensional extents and may be of an arbitrary profile. The construction or remodeling of hotel suites that include kitchen areas where cooking by guests is contemplated can also benefit by the use of this apparatus and the new installation method.

Also, other embodiments exist within the scope of the invention. For example, although the control box is described having two functions raise and lower only, a control box including a key switch or code-key button array to prevent unauthorized use is also within the scope of the invention, which leads to further contemplation that the motor controller requires a valid activation code which is programmed to lapse after a period of time so as to disable a stolen unit. Theft of valuable mobile equipment from a contractor's business by unscrupulous employees or by other thieves at a job site is foreseeably prevalent, and electronic disabling means are an obvious extension residing within the scope of the current invention. The invention includes those embodiments with the control box attached to the tiltable frame and those with the box attached to other portions of the cart, and those which have no separate control box at all and receive all motor drive commands from a hand-held remote control key pad or key fob.

Although configuring the cart to have four wheels is the most common embodiment, a cart of as few as three wheels is a workable embodiment, and a cart having more than tour wheels is also contemplated within the scope of the invention.

Although the best mode of construction of this slab moving device includes two vertically extendable telescoping struts, a rolling, cart having, any number of such struts working in concert to define a pivot axis of a tiltable frame all remain within the scope of the invention, including a cart fitted with only a single such strut, preferably but not necessarily centrally placed on the cart, with its upper end constraining the attached tiltable frame to an axis of rotation.

Also, although the detailed description of the invention describes radio control signals emitted by a hand-held fob and received by an antenna, other signals emitted by a remote signal emitter transmitting in modes such as infrared signals, Blu-tooth or other information exchange protocols, audio commands, audio command processing by means of a voice recognition chip included in the control module, and ultrasonic signaling are all within the scope of the invention along with the complementary signal receiving sensors appropriate for these signal transmission modes. In place of a key fob, an 'app,' that is, a software application installable to hand-held computer devices such as cell phones and tablet computers, for the exchange and display of information, control signals, and device statuses, is also contemplated within the scope of the invention.

Additionally, although this specification mentions a control now having electrical switches such as push buttons or a rocker switch, other switching sensors such operated by stimuli sensed by sensors sensitive to local changes in static electric field strength, temperature, tactile pressure (such as touch screens,) or proximity of a nearby object are also contemplated within the invention.

Although tilting of the tiltable frame can be effected manually, that is, by an operator's physical body or muscular force, mechanical assistances in the form of mechanical, pneumatic, electrical or hydraulic mechanisms is contemplated within the invention, including but not limited to linear actuators, but also rotational power drive systems coupled to the pivot axles of the device.

Also, although a tilt lock mechanism has been described primarily as a cable release mechanism, other effective means of coupling release handle motion to retraction or engagement of a locking member are also contemplated within the invention, such as a mechanical linkage of pushrods and bellcranks, or an electrical network of control buttons or switches which activate solenoid locking members or magnetic gripping devices.

While certain features and aspects have been described with respect to exemplary embodiments, one skilled in the art will recognize that numerous modifications are possible. Also, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Furthermore, the procedures described with respect to one method or process may be incorporated within other described methods or processes; likewise, system components described according to a particular structural configuration and/or with respect to one system may be organized in alternative structural configurations and/or incorporated within other described systems. Hence, while various embodiments are described with or without certain features for ease of description and to illustrate exemplary aspects of those embodiments, the various components and/or features described herein with respect to a particular embodiment can be substituted, added, and/or subtracted from among other described embodiments, unless the context dictates otherwise. Consequently and in summary, although many exemplary embodiments are described above, it will be appreciated that the invention is intended to cover all modifications and equivalents within the scope of the following claims.

What is claimed is:

1. A slab moving device comprising:
    a rolling cart;
    a generally planar frame, tiltably mounted on said cart;
        said frame tiltable between a horizontal and a vertical position;
    at least one vertically extendable strut affixed to said rolling cart with said tiltable frame rotatably coupled to said vertically extendable strut so as to define a vertically adjustable pivot axis of said frame; and
    at least one transit chock spaced apart from at least one of said vertically extendable strut to form a gap of a predetermined width, into which can be received said tiltable frame.

2. The slab moving device of claim 1, further comprising: an operable strut extending mechanism.

3. The slab moving device of claim 2, wherein said operable strut extending mechanism further comprises an extendable member which is also a damping member.

4. The slab moving device of claim 1, wherein said strut extending mechanism is operated by a battery-powered motor.

5. The slab moving device of claim 4, wherein said strut extending mechanism and said battery-powered motor are operated by remote control.

6. The slab moving device of claim 4, wherein said strut extending mechanism and said battery powered motor are controlled by at least one switch.

7. The slab moving device of claim 6, wherein at least one of said at least one switch is affixed to said tiltable frame.

8. The slab moving device of claim 1, wherein said strut extending mechanism comprises a threaded shaft.

9. The slab moving device of claim 8, wherein an end of said threaded shaft comprises a hexagonal cross-section.

10. The slab moving device of claim 1, wherein said tiltable frame is fabricated from tubing in which at least one tube end is capped off by a bumper.

11. The slab moving device of claim 1, further comprising:
    adhesive-backed high-friction material affixed to at least one transit chock.

12. The slab moving device of claim 1, further comprising:
    adhesive-backed high-friction material affixed to said rolling cart.

13. The slab moving device of claim 1, further comprising:
    a plurality of support blocks made of a compliant material affixed to said rolling cart.

14. The slab moving device of claim 1, further comprising:
    at least one extendable member connected between said tiltable frame and said at least one vertically extendable member, wherein said at least one extendable member further comprises a mechanical damper.

* * * * *